United States Patent

Pope

[15] 3,665,438

[45] May 23, 1972

[54] APPARATUS FOR CONTROLLING TAPE SPEED

[72] Inventor: Kenneth E. Pope, Litchfield Park, Ariz.

[73] Assignee: Cas, Inc., Phoenix, Ariz.

[22] Filed: Aug. 1, 1969

[21] Appl. No.: 846,779

[52] U.S. Cl. ..................340/174.1 A, 179/100.2 S, 242/207, 318/312

[51] Int. Cl. ...................................G11b 15/52, B65h 25/12

[58] Field of Search ............................179/100.2 S; 242/207; 318/311–315; 340/174.1 A

[56] References Cited

UNITED STATES PATENTS

| | | | |
|---|---|---|---|
| 1,976,355 | 10/1934 | Mees et al. | 318/313 |
| 2,603,688 | 7/1952 | Cole et al. | 318/312 |

*Primary Examiner*—Bernard Konick
*Assistant Examiner*—J. Russell Goudeau
*Attorney*—Drummond, Cahill & Phillips

[57] ABSTRACT

A magnetic tape cassette, having magnetic tape therein pre-recorded with a clock track, receives information in digitally encoded form from a keyboard. The information from the keyboard is encoded and temporarily stored in a magnetic core encoder and subsequently delivered to a shift register. The shift register applies the information to the cassette magnetic tape on a data track parallel to the clock track. Clock pulses are placed on the data track at the beginning of each bit cell to identify the bit cell boundary. The data clock and the data bit are written in concert with the pre-recorded clock track so that the data track on the cassette magnetic tape may be written and subsequently be read independent of the velocity considerations. The information thus recorded on the cassette magnetic tape is transferred to conventional computer tape by reading the data present in the data track and re-encoding the data to be temporarily stored in a buffer. The information thus stored is read onto the computer tape in the middle three tracks of the computer tape regardless of the number of tracks available on the computer tape. The information is read onto the computer tape such that each transverse bit position on the tape represents an encoded form of a single information bit rather than the encoded form of an information character. The magnetic tape cassette is mounted in a receiver that is hinged to permit removable engagement of cassette hubs with a spindle. The spindle is driven by an electric motor, the speed of which is controlled by applying electrical energy thereto from an oscillator through a gate; the gate is responsive to pulses from the pre-recorded clock track for controlling the drive motor velocity.

3 Claims, 15 Drawing Figures

APPARATUS FOR CONTROLLING TAPE SPEED

With the advent of modern data processing systems and the utilization thereof on a widespread basis throughout industry and commerce, significant bottlenecks have evidenced themselves. The chief problem and expense involved in the use of a data processing system is the error-prone step of human communication with the machine. Characteristically, information to be provided to a data processing system is derived from a human recognizable form having certain intra-informational meanings; this information must be translated into machine readable form and must also be placed in a predetermined format to preserve the intra-informational content thereof. Usually, information is accumulated from a primary or source document recognizable to humans and containing certain data that requires storage and manipulation. This information is then translated by human operators into machine readable form and format. Of the most typical forms and formats, the punched card is the most common. The cards, having been punched by a key punch operator, may be stored in "decks" and may subsequently be fed through a card reader for electrical, pneumatic, or electro-optical reading. The cards present problems arising from the physical characteristics of materials used in their construction as well as the characteristics derived from the dynamic handling of the cards prior, during, and subsequent to reading. The dimensional requirements of the card are such that the machine readable information contained thereon is extremely limited which, in turn, gives rise to the requirement of large volumes of cards for a relatively small amount of information. This "inefficiency" inherent in punched cards militates against the obviation of human error by the utilization of redundancy. In other words, since the information content on a card is extremely limited by reason of its physical characteristics, the possibility of using duplicate or triplicate entries of information on the card is eliminated and key punching errors that would otherwise be eliminated by redundancy are tolerated.

To complete the communication with a data processing system, the significant differential in operating speeds between the electronic data processor and the mechanical card reader must be taken into account. It is not uncommon that the complete record achieved by "transcribing" course information onto punched cards is read directly from a card reader onto magnetic tape. In this fashion, the information to be stored and manipulated can be read into the appropriate storage facilities of the data processor, can be manipulated, and can be "redelivered" to magnetic tape in orders of magnitude faster than if the system were to attempt to communicate with punched cards.

The possibility presents itself of eliminating punched cards by entering the information directly onto computer magnetic tape without first being reduced to punched card form. However, any attempt at this "shortcut" is immediately eliminated in prior art thinking since the equipment necessary would be exceedingly expensive when compared to the relatively modest cost of key punch equipment. The computer magnetic tape drives and indeed the computer magnetic tape subsystems forming a part of the data processing system cannot be "sacrificed" for the use of a task so mundane as the receipt of key punched information. In many instances, key punch equipment is located remote from the data processing system and the punched cards derived therefrom are transmitted substantial distances to a data processing center for handling. Therefore, the equipment located at the key punch area must be economically competitive with the simple key punch equipment.

It is therefore an object of the present invention to provide a means for communication with a data processing system without the utilization of punched cards.

It is another object of the present invention to provide a means for communicating with a data processing system wherein primary information is fed directly into magnetic tape for subsequent utilization in the system.

It is still another object of the present invention to provide a system for gaining access to a data processing system wherein the primary information is fed directly to a magnetic tape through a keyboard.

It is still another object of the present invention to provide a system whereby primary information may be fed directly to magnetic tape in a convenient and economical fashion for subsequent utilization by a data processing system.

It is still another object of the present invention to provide a system wherein primary information may be fed directly to magnetic tape from a keyboard and wherein the magnetic tape may subsequently be utilized to read onto a second tape regardless of the magnetic track configuration used by the data processing system.

It is still another object of the present invention to provide a means whereby keyed information may be read directly onto magnetic tape independently of magnetic tape velocity.

It is another object of the present invention to provide a system wherein keyed information is encoded into a unique magnetic track configuration for temporary storage and wherein the stored information is subsequently placed directly on computer readable magnetic tape.

It is still another object of the present invention to provide a system wherein primary information may be keyed onto a first magnetic tape for subsequent utilization on a second magnetic tape and wherein the system may economically utilize redundancy techniques for the elimination of errors.

These and other objects of the present invention will become apparent to those skilled in the art as the description thereof proceeds.

The present invention may readily be described by reference to the accompanying drawings, in which.

Figure 2:
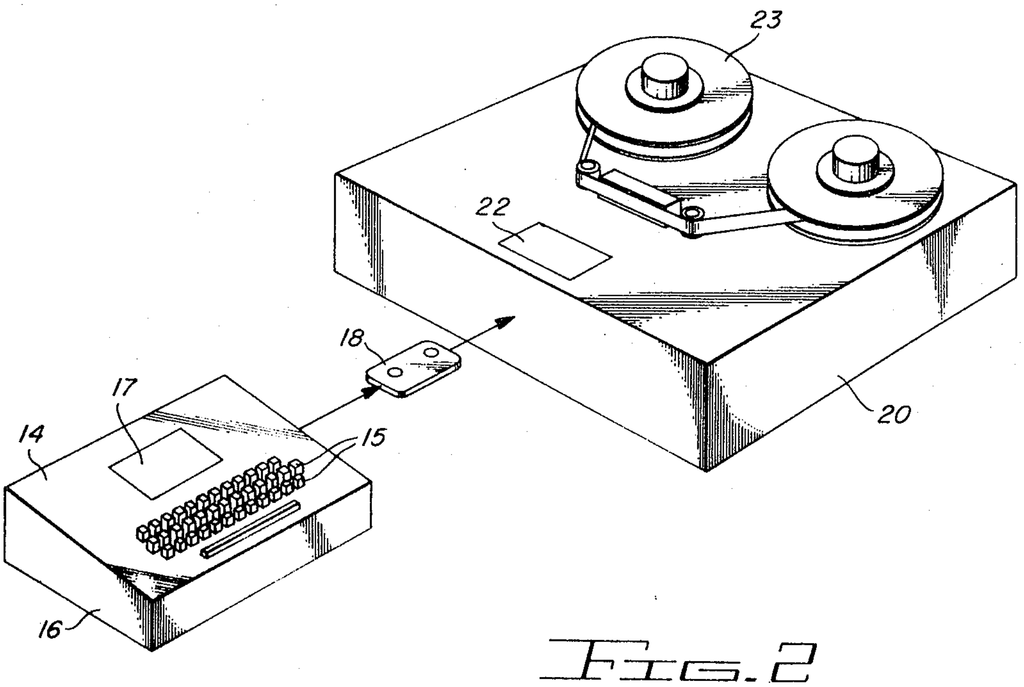
FIG. 2 is a partially pictorial representation of the block diagram of FIG. 1.
Figure 1:
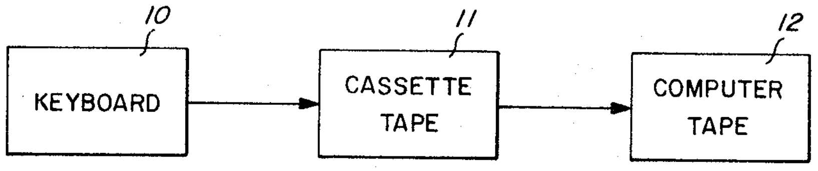
FIG. 1 is a simplified block diagram of apparatus for entering keyed information onto computer magnetic tape.

The present invention contemplates the utilization of a typewriter-like keyboard by an operator for transcribing information in a manner similar to the operation of a key punch. However, rather than the information being "punched" into a conventional punched card configuration, the actuation of a key on the keyboard results in the magnetic recording of the information on a magnetic tape. This magnetic tape is of a particular type and is subsequently used as a means to transfer information directly onto a conventional computer readable magnetic tape. The functional block diagram of FIG. 1 illustrates the system of the present invention where it may be seen that the keyboard 10 is used to encode information onto a particular type of magnetic tape which we shall refer to as a cassette tape 11. The cassette tape, to be described more fully hereinafter, is therefore used as an intermediate storage facility for storing the information keyed thereinto; the utilization of the cassette tape permits storage densities of the information of such magnitudes as to render economically feasible the principles of redundancy to detect and eliminate errors. The cassette tape is subsequently transcribed into an appropriate format on conventional computer readable tape 12. The structural elements for effectuating the functions of FIG. 1 are shown in simplified form in FIG. 2. A keyboard 14 having a plurality of keys 15 which may take any convenient form such as a typewriter keyboard or a modification thereof, is positioned on a housing 16 having a cassette receiving area 17 therein. The cassette, such as shown at 18 in FIG. 2, is a twin hub rectangular cartridge having an open side thereof exposing the tape so that it may be written upon or read. The cassette, after receiving the information placed on it by the operator may then be transferred to a converter 20 or stored. The information on the cassette tape, including the utilization of redundancy techniques, permits the storage of information equivalent to the information content of approximately 500 fully punched cards. The converter includes a cassette tape receiving area 22 into which the cassette 18 may be placed and subsequently to be read. The converter 20 reads the information on the cassette tape and transfers the information through an appropriate format conversion onto a conventional reel of computer tape 23.

Figure 3:
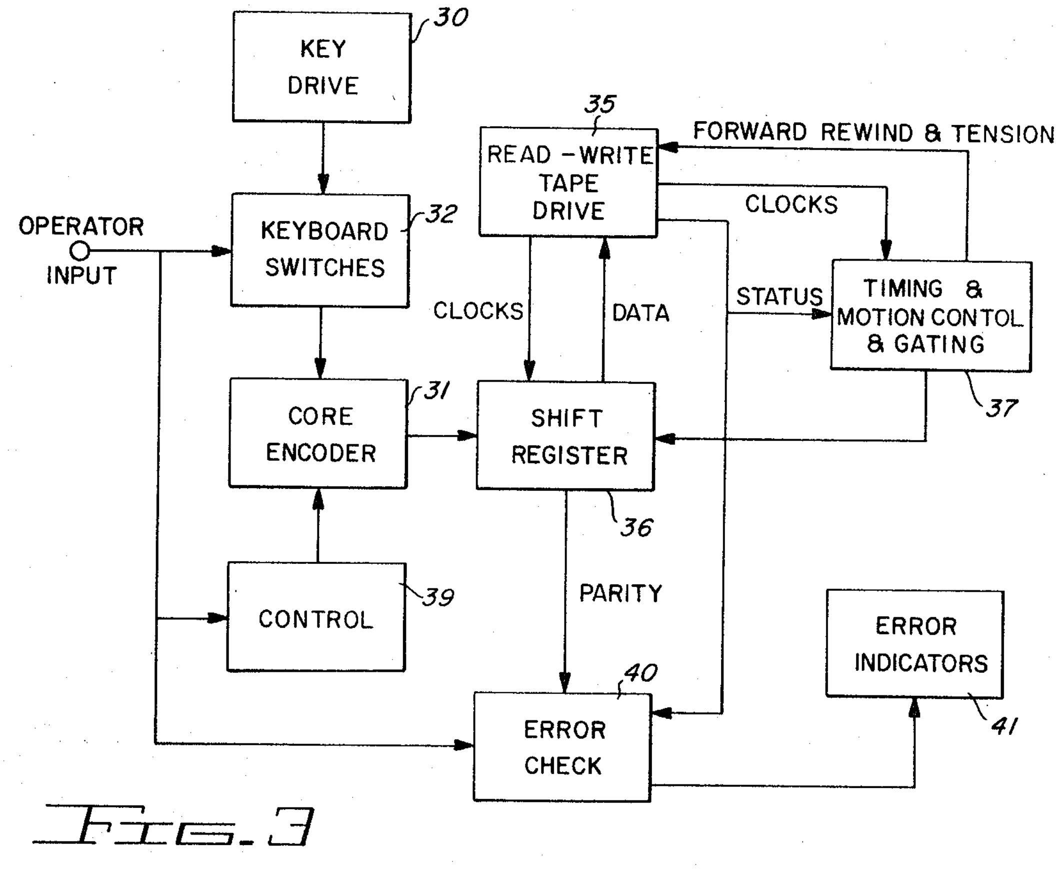
FIG. 3 is a schematic block diagram illustrating a system for recording information on cassette magnetic tape in accordance with the teachings of the present invention.

Referring now to FIG. 3, the elements for encoding the cassette tape are shown in block form. An electronic key drive 30 provides suitable energizing current to drive the magnetic cores of a core encoder 31. Keyboard switches 32, when depressed by an operator, complete the necessary circuit path from the key drive to the cores of the core encoder. The encoded information may then be written onto the cassette tape through the write heads 35 via a shift register 36. The cassette tape is pre-recorded with a clock so that the information being recorded thereon from the shift register is actually "clocked" onto the tape while the tape motion and gating of the data to the tape is co-ordinated by a motion control and gating system 37 to be described later in connection with FIG. 12. The insertion of information into the system at the operator input is also detected by a control center 39 and is applied to error checking circuitry 40; the latter also receives appropriate signals from the read and write heads 35 and the shift register 36. A detection of an error generates an output from the error check circuitry 40 to error indicators 41.

Figure 4:
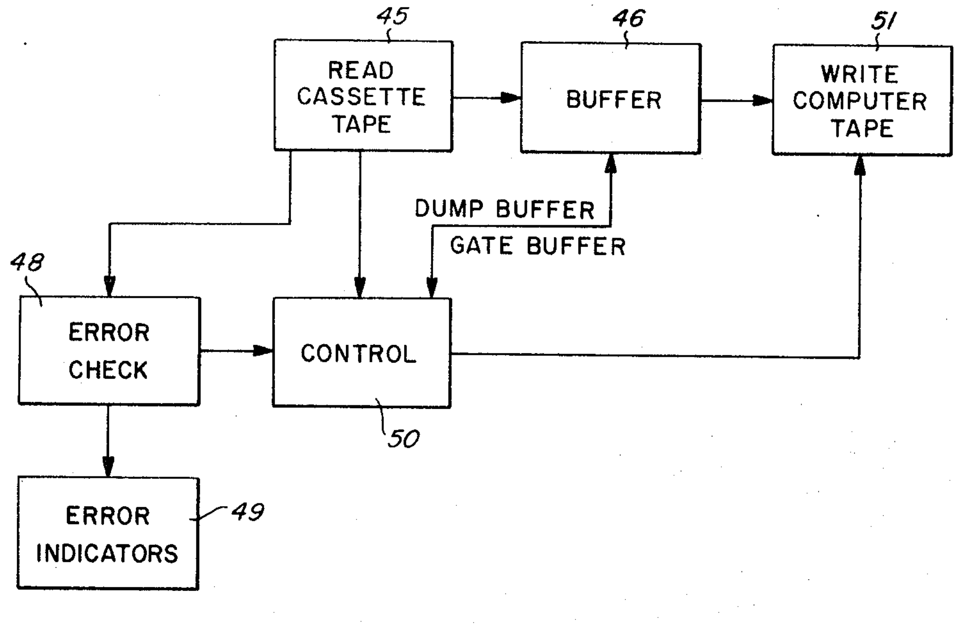
FIG. 4 is a schematic block diagram of a system for transferring information previously recorded on cassette magnetic tape onto computer tape in accordance with the teachings of the present invention.

The transfer of information from the cassette magnetic tape to conventional computer tape may be described by connection with the simplified schematic drawing of FIG. 4 wherein read heads 45 are utilized to read the information contained on the cassette tape and temporarily store the information in a buffer 46. The information is also monitored by error check circuitry 48 which, upon the detection of an error, will energize an appropriate error indicator 49. A control system 50 also monitors the information read from the cassette tape and gates the information to the buffer 46. At the appropriate time, the information temporarily stored in the buffer 46 is dumped through write heads 51 to the computer tape. FIGS. 3 and 4 therefore illustrate in a simplified form the progress of information keyed by an operator as it is encoded and placed on the cassette tape and is subsequently read, buffered, and placed in suitable form on conventional computer tape. The utilization of cassette tape in this manner permits storage densities compatible with magnetic tape concepts so that redundancy is economically feasible and errors are eliminated. The cassette tape, even using substantial redundancy, provides a tremendous advantage in the storage of information because of its compactness, resistance to damage of the type punched cards are subjected to, and its reliability.

Figure 5:
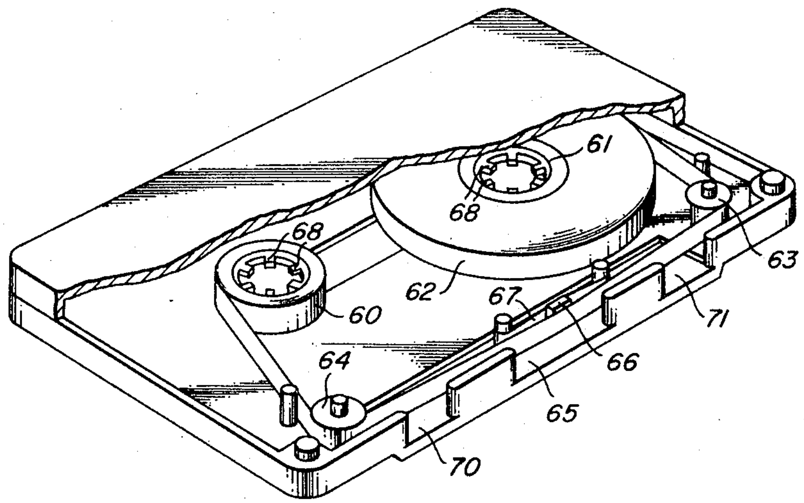
FIG. 5 is a perspective view, partially broken away, of a magnetic tape cassette for use with the present invention.

Referring now to FIG. 5, a typical magnetic tape cassette is shown. The cassette includes hubs 60 and 61 upon which magnetic tape 62 is wound. The tape extends from one hub, such as 61, around tape guide pulleys 63 and 64, and also passes over an opening 65 positioned between the pulleys 63 and a The tape is backed at the opening 65 by 64. felt pad 66 which is spring-mounted on a non-magnetic but metallic leaf spring 67. The tape is driven from one hub to the other through the utilization of splined shafts (not shown) which engage the teeth 68 extending radially inwardly of the hubs 60 and 61. The cassette is normally formed of a rigid plastic material and is rectangularly shaped. The cassette is completely enclosed with the exception of the opening 65 and openings 70 and 71 along one edge of the cassette. Also, openings in the top and bottom of the cassette extend therethrough so that the previously mentioned splined shafts may extend into the cassette and engage the hubs. The cassette is conveniently mounted in a cassette drive by simply placing the cassette on the splined shafts that engage the hubs in a manner similar to magnetic cassettes utilized in audio applications. Characteristically, the tape is quite narrow by present day computer tape standards (0.15 inches) and each cassette will contain approximately (300) feet of tape. It will be obvious that the cassette can be expanded or reduced to provide the necessary storage capacity for the particular system involved in a specific application.

Figure 6:
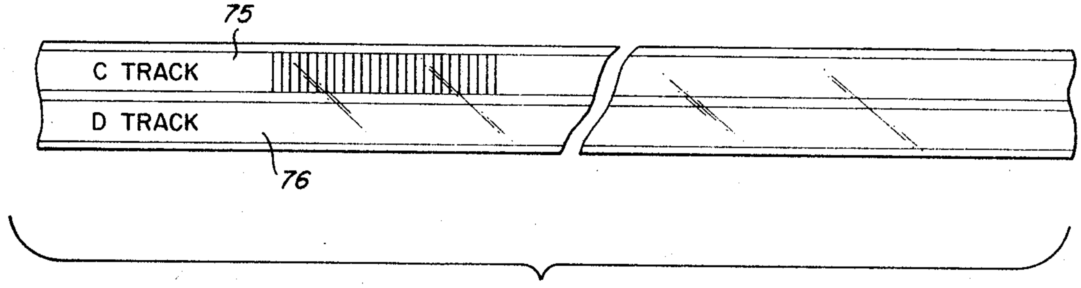
FIG. 6 is an enlarged view, partially schematic, illustrating the clock and data tracks of the cassette magnetic tape.

The cassette magnetic tape is shown in FIG. 6, wherein it may be seen that two tracks on the tape are utilized. A clock track or C track 75 and a data track or D track 76 are utilized on the cassette tape to permit the recording of information or data and the proper reading and synchronization of the data without regard to tape speed. The C track contains pre-recorded clock pulses, the density of which may vary considerably; however, for purposes of illustration, a clock density of 1,500 bits per inch is used. The clock track may be pre-recorded in any convenient manner using conventional equipment. The density on the clock track is thus substantially below the normal density of average quality magnetic tape and can be increased to provide greater data packing on the tape if desired. The pre-recorded clock track provides a number of advantages which will be discussed in greater detail later and also functions to control the gating of data onto the cassette tape to permit redundancy and thus increase reliability.

Figure 7:
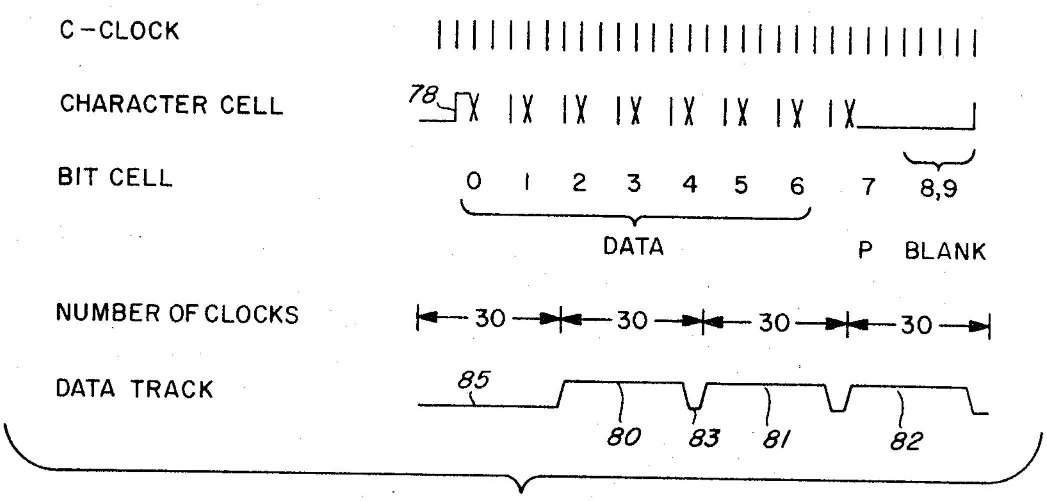
FIG. 7 is a schematic timing diagram showing the relationship of the cassette magnetic tape clock track with the character cell and the bit cell on the magnetic tape.

The relationship of the clock track to the data track and the manner in which the data is written onto the cassette tape may more readily be described by reference to FIG. 7. The flux reversals on the clock track shown in FIG. 7 as the C-clock represent the basic timing interval used by the system of the present invention to write upon the cassette tape. Immediately below the C-clock in FIG. 7 is shown a character cell containing a plurality of bit cells and the relationship of these cells to the C-clock flux reversals. Following the flux pattern of the character cell from left to right in FIG. 7, it may be seen that there is a flux reversal at 78 (a non-return to zero recording technique is used) which initiates or opens a bit cell which is followed by two more clock periods, during which time there may or may not be another flux reversal, depending on whether or not the bit within the cell is a 1. The next definite flux reversal of the character cell occurs at 79. The flux reversals and the character cell caused by the C-clock are thus 3 clock pulses apart, leaving a bit cell having 2 clock pulse periods in which to reverse flux. An X is placed in the position of each bit cell of FIG. 7 corresponding to the location (in relation to the C-clock) that a flux reversal would occur if a bit within that cell were at 1. The bit cells are labeled data bits 0 through 6, while bit cell 7 is labeled "P" for parity and bit cells 8 and 9 always remain blank for purposes to be explained more fully hereinafter. It may therefore be seen that each bit cell begins with a flux reversal and that the informational content within the bit cell depends on whether or not there is a flux reversal after the first flux reversal. It may also be seen that there are 2 clock periods within the bit cell in which a flux reversal may occur to denote the informational content of that bit cell. The technique thus far described utilizing a plurality of clock periods to provide a bit cell for a flux reversal increases the time available between the detection of a flux reversal to indicate the beginning of a bit cell and the detection of a flux reversal indicating the informational content of that cell. The timing requirements imposed on the system reading the cassette tape are thus reduced and problems such as tape skew are minimized. The lower portion of FIG. 7 illustrates the technique of redundancy used in the present system. Each character cell (comprising 10 bit cells) is recorded three successive times on the data track. Thus, it can be seen, for example, that the flux pattern shown for the character cell is reproduced on the data track at 80, 81, and 82. It will be recalled that at the end of each character cell, bit cells 8 and 9 were left blank; thus, each of the repeated character cells 80, 81, and 82 are separated from each other by bit cells deliberately left blank, such as shown at 83. Further, the character cells occupy a space on the data track corresponding to 30 flux reversals of the clock track. The first character cell 85 is left completely blank; the blank character insures a gap between characters written on the cassette tape and also allows the tape to achieve nominal speed before the first character is read or written. Thus far, it may be seen that when a character is to be written on cassette tape, the tape drive is initiated and the pre-recorded clock track is sensed. A space corresponding to a single character on the data track is purposely left blank and the character is thereafter written, bit cell by bit cell, into the following character cell. At the end of the character cell, two blank bit cells are provided immediately followed by a repeat of the bit cell by bit cell recording of the character cell; the character is written serially three successive times, each time requiring 30 clock track flux reversals. Further, each bit cell was initiated by a flux reversal followed by two clock periods within which the flux is reversed if the information content of that particular cell is a 1. Another important feature of the present system may be seen in that the pre-recorded clock track is used to organize the writing of information in character cells on the cassette tape; however, the resulting tape is nevertheless not skew-sensitive because the clock track was used only to generate a clock frequency and the relation of the flux reversal of the pre-recorded clock track to the flux reversals on the data track is immaterial. The resulting cassette recording system thus provides information on the cassette magnetic tape that can be read without regard to tape speed, without regard to cassette tape skew, and at a low clock track density. This latter feature is provided by the fact that two blank spaces are provided after the beginning of each bit cell, thus rendering the timing within each bit cell relatively uncritical.

Figure 8:
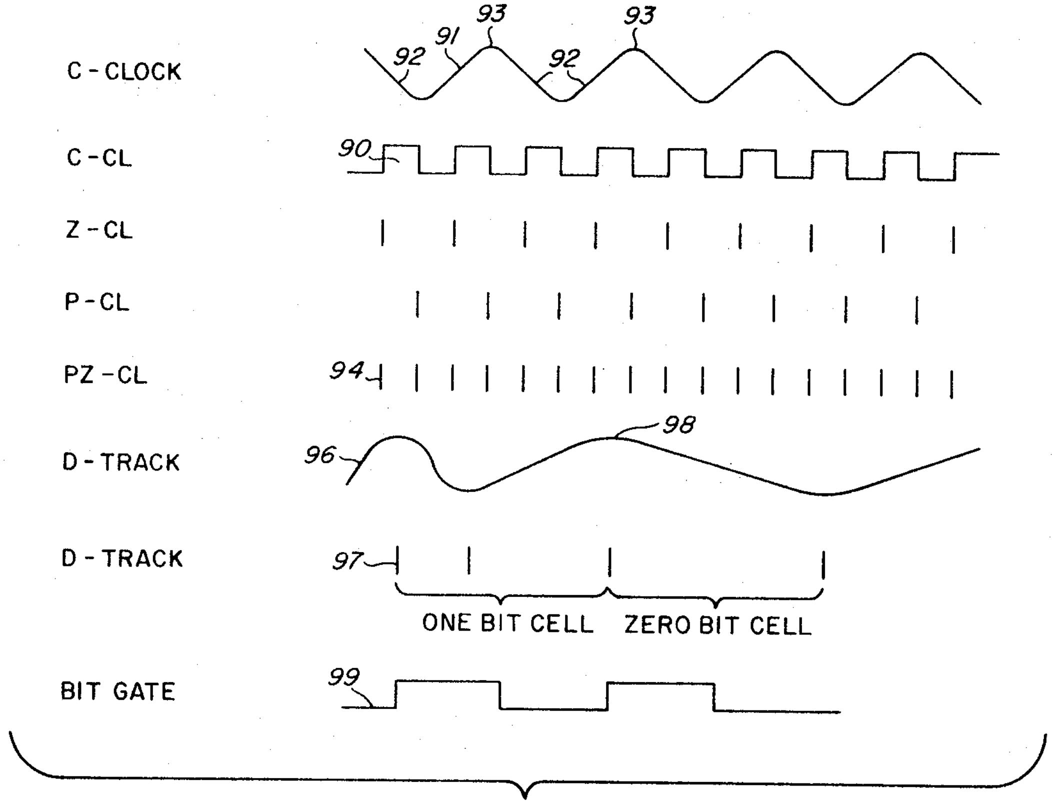
FIG. 8 is a schematic illustration of the analogue waveform of the cassette magnetic tape clock track and data track together with the digitized form of each illustrating the manner in which information is placed in a bit cell.

Referring now to FIG. 8, we may examine the mechanics involved in reading the cassette tape formed in the manner described above. In FIG. 8, the analogue waveform of the clock track is shown as the C-clock. Two portions of the analogue waveform are utilized to develop a digitized clock waveform having a frequency equal to twice the clock frequency. The digitized form is shown as waveform 90 directly beneath the analogue waveform 91. It may be noted that this double frequency is derived from the detection of the zero crossover points 92 and the waveform peaks 93 on the analogue waveform; these are shown in digitized form as the peak/zero crossover clock (PZ–CL) 94. The zero crossover clock (Z–CL) and the peak clock (P-CL) are also shown in FIG. 8. The operations relating to the data track are keyed to the zero crossover clock as may now be described by reference to the data track analogue waveform 96 and the digitized form of that waveform shown at 97. The data track begins at a bit cell on the left with a detection of a zero crossover clock. The waveform 96 is in response to this detection and results in the digitized output shown in waveform 97. This first pulse indicates the beginning of a bit cell and the next bit position comes at the next zero crossover point of the analogue clock waveform. At this point, it may be noted that the analogue of the data track has experienced a flux reversal resulting in a digitized form representing a 1 in the bit cell. The following zero crossover clock time results in a deliberate blank space followed by the next zero crossover of the clock analogue waveform. This last zero crossover results in the generation of a flux reversal in the data track represented by the analogue of the data track at point 98. The next two zero crossover points of the clock analogue are not accompanied by any flux reversals in the data track, thus indicating that the bit cell contains a zero. The waveform 99 shown in FIG. 8 represents the gating of the system to read the appropriate portions of the two above-discussed bit cells to thus determine the information content therein. This particular gate waveform is triggered by the detection of the first flux reversal of each bit cell.

FIG. 8 thus demonstrates the actual analogue waveform derived from reading the pre-recorded clock track on the cassette tape and the analogue waveform of the data track. The relationship between the two can be seen to result in the digitized form demonstrating two successive bit cells, the first of which contains a 1 and the second of which contains a 0. The analogue waveform may be utilized to generate a double frequency but only the peaks of the analogue clock are used to read the data track.

Figure 9:
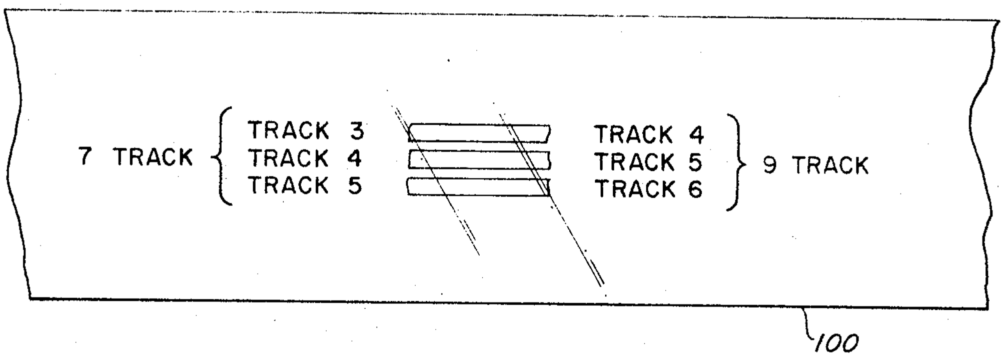
FIG. 9 is an enlarged view of a portion of computer magnetic tape illustrating the middle three tracks upon which information is recorded in the system of the present invention.

Referring now to FIG. 9, a section of conventional computer magnetic tape is shown. The tape 100 contains a plurality of longitudinally extending parallel tracks, each of which contains information interrelated with the other tracks. Characteristically, the computer tapes include either 7 track or 9 tracks. In the illustration of FIG. 9, tracks 3, 4, and 5 of a 7-track tape and tracks 4, 5, and 6 of a 9-track tape are illustrated. In the system of the present invention, only the three middle tracks of either the 7 or 9 track tape are utilized for the receipt of the information from the cassette tape. In this fashion, the cassette tape may be fed into a system requiring 7 or 9-track magnetic tape input. Writing only on the center three tracks of the computer tape incorporates a number of advantages. The center tracks on the computer tape are generally regarded as more reliable since they are less susceptible to edge damage and the inclusion of dirt; further, skew on the center three tracks is obviously much less than on the outside tracks. The full compatibility with 7 or 9 track computer tape systems alleviates a significant problem in the utilization of cassette tapes with a variety of data processing systems.

The manner of recording or encoding the information on the three center tracks of computer magnetic tape may now be described. It will be recalled that the information originally encoded on the cassette magnetic tape was in the form of serial bit recording, each character block of which was repeated to provide triple redundancy. In the method for imparting this information to computer magnetic tape, the information is read from the cassette tape in a converter and is re-encoded to be placed, bit by bit, onto the three middle tracks of the computer tape. A code is used which provides extreme reliability as well as enables the locating of the ends and thus the beginnings of characters on the computer magnetic tape. Further, the recording scheme is significantly different from either the code used for the original recording on cassette tape or codes previously used in digital magnetic tape recordings. Specifically, the code contemplated in the present system uses the three center tracks on 7 or 9 track computer magnetic tape to transversely record either three bits to represent a data bit 1 or a 1 bit in a bit track to represent a data bit 0; similarly, parity is indicated by a 1 bit in either of 2 of the 3 tracks.

Figure 10:
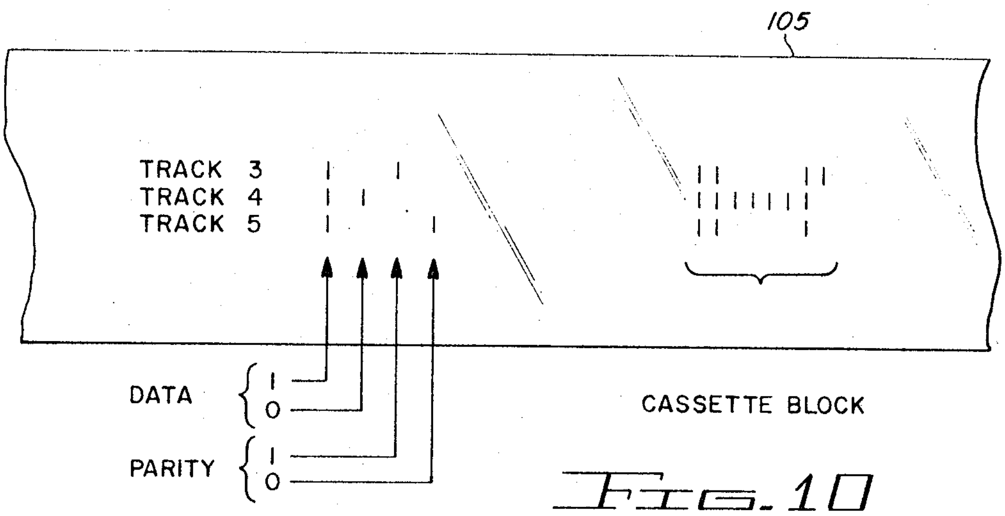
FIG. 10 is a schematic illustration of the computer magnetic tape of FIG. 9, illustrating the informational content recorded on the magnetic tape.

Referring to FIG. 10, an example of the encoding technique is shown utilizing a 7-track computer magnetic tape. It may be noted that in the 7-track system, a 1 bit in tracks 3, 4, and 5 is the equivalent of an octal 34, whereas a single bit in track 4 is the equivalent of an octal 10. The equivalence of the octal characters will obviously be different when the computer magnetic tape is the 9-track variety; however, the concept involved is the same. Thus, if a character previously written on the cassette tape was 1,100 1,100 (ASCII 3 character), the octal equivalent of the information transcribed onto the computer tape will be 34 34 10 10 34 34 10 10 20. It may be noted that in a system using even parity, the parity bit added to the end of the character thus serially placed on the tape for the above number would be a 0. As indicated previously, the parity bit 0 finds its equivalent in an octal 20. Referring to FIG. 10, a simplified version of the method of recording is shown. In that figure, the computer magnetic tape 105 is shown having tracks 3, 4, and 5 inscribed, reading from the left, an octal 34 or data bit 1 followed by an octal 10 or data bit 0. Immediately following the two data bits may be found a bit in track 3 which is the equivalent of an octal 4 or parity bit 1. Lastly, a bit occurring in track 5 indicates the octal 20 or parity bit 0. Reading further to the right in FIG. 10, a character may be seen which, in octal form, is represented by 34 34 10 10 10 10 34 4; translated, this character is thus 1 1 0 0 0 0 1, with the appropriate parity bit for even parity.

Each character placed on cassette magnetic tape is thus read in the converter and placed in a buffer. If the first character of the triple serial recording of the character on the cassette magnetic tape is faulty in any way, the second repetition of that character is read. Likewise, if the first and second recordings of a character on the cassette magnetic tape are faulty (highly unlikely), the third repetition is read. The utilization of redundancy renders the probability of error occurring in the final computer tape substantial orders of magnitude less than if similar information were entered by punched card. The characters thus stored in the buffer are recorded on computer magnetic tape in the format described in connection with FIGS. 9 and 10. Each character on the computer magnetic tape is thus encoded serially bit by bit in a code format using a bit array transverse of the longitudinal direction of the computer tape. This transverse array conveniently has an octal equivalent as described above. For convenience, each character recorded on computer magnetic tape, such as the character 1 1 0 0 0 0 1 as shown in FIG. 10 (octal 34 34 10 10 10 10 34) may be called a cassette block. A plurality of cassette blocks are placed on computer tape and, after a predetermined number of these blocks have been recorded, they are re-recorded to provide redundancy.

Figure 11:
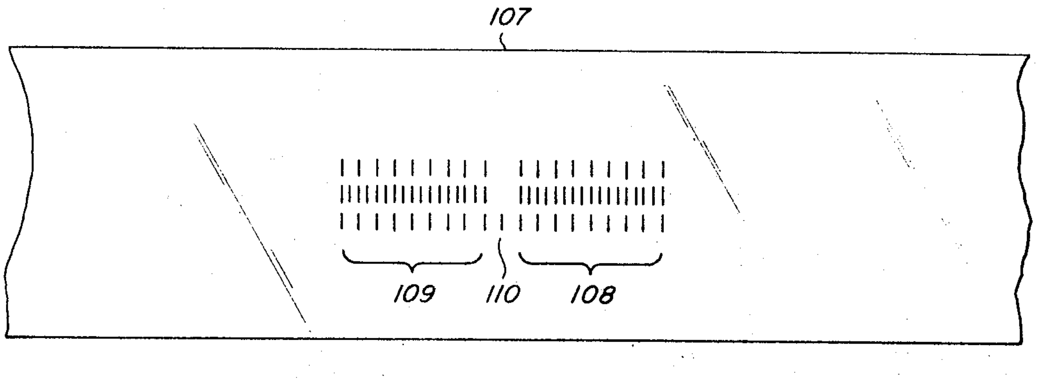
FIG. 11 is a schematic diagram showing a section of computer magnetic tape illustrating the arrangement of cassette blocks thereon.

Referring to FIG. 11, the computer magnetic tape 107 shown therein schematically indicates 64 cassette blocks 108 immediately followed by an identical recording 109 of the 64 cassette blocks. The space between the 64 cassette blocks 108 and 109 are separated by parity bits provided at 110 simply to facilitate the locating of the second 64 cassette blocks if the computer tape is defective in some respect during the reading of the first 64 cassette blocks. It may be noted that while the coding present on the computer magnetic tape is a code of the respective bit content, the magnetic tape will nevertheless be read by the computer as several tape characters (i.e., a coded bit 1 or octal 34 will be read by the computer simply as 3 bits in the three center tracks of the tape with zero bits in the adjacent tracks at that transverse location). The manipulation of the coding within the computer may economically and rapidly be performed in accordance with programs to fit the needs of the specific application. The conversion from the computer magnetic tape code provided by the present system into a convenient coding system for use in a particular problem is achieved by using data processing time which is considerably less expensive and more rapid than attempting to code convert by specialized equipment provided for that purpose.

Figure 12:
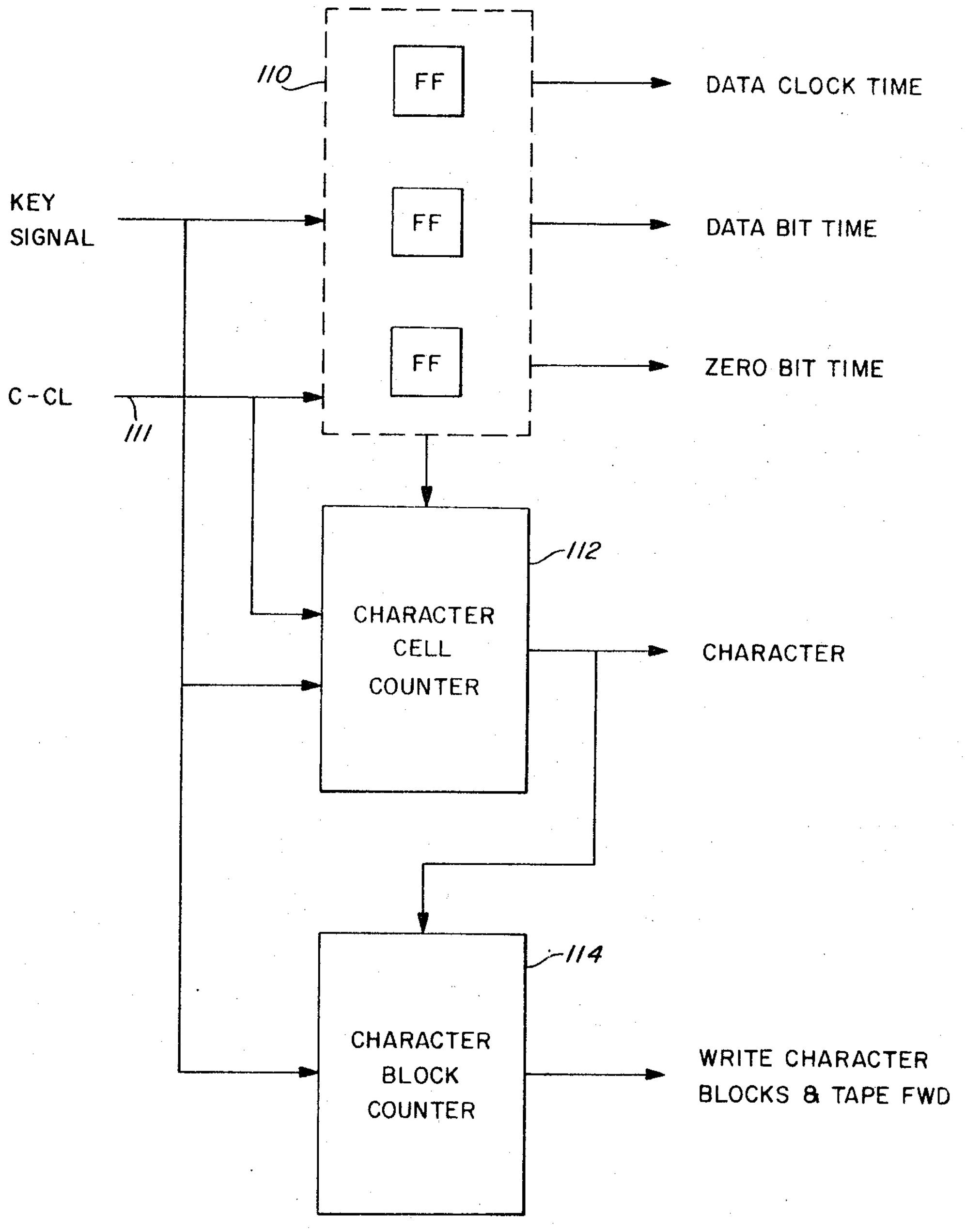
FIG. 12 is a schematic block diagram of a suitable timing and motion control and gating arrangement for use in the schematic block diagram of FIG. 3.

A number of specific circuitry and/or logic configurations may be used to implement the concepts described above. It will be obvious to those skilled in the art that a wide variety of well known and proven design procedures may be used to arrive at a specific logic configuration for realizing the concepts of the present invention. For example, writing redundant characters on the cassette magnetic tape may readily be achieved by a system such as shown in FIG. 12. When a character is keyed by an operator into the keyboard, the control circuitry may easily achieve the timing and gating of the keyed information. The generation of a key signal by the depression of the key may gate a bit time counter 110 to enable it to be receptive to the pre-recorded timing bits on the cassette tape. These timing bits or cassette clock (C–CL), when applied to the bit time counter 110, result in the generation of a data clock time signal which results in the recording of the data clock bit in the data track of the cassette magnetic tape. It will be recalled that this data clock bit is used to mark the beginning of a bit cell. The bit time counter 110 subsequently, at the next cassette clock, generates a data bit time signal which may be used to gate a data bit from the shift register (reference numeral 36 in FIG. 3) into the appropriate position of the bit cell. The last period of the data bit cell is signalled by the bit time counter 110 as the 0 bit time during which, it will be recalled, nothing is written on the cassette magnetic tape. The bit time counter is shown schematically in FIG. 12 comprising three flip-flops which may be conveniently interconnected to cause a "bit" to circulate through the flip-flops to successively energize the output lines corresponding to the data clock time, data bit time, and 0 bit time.

A character cell counter 112 may be formed of a conventional decade counter receptive to the counting of the bit time counter to keep track of the specific bit cell within the character which is presently being considered. Thus, the character cell counter will determine the specific bit cell being written and can provide an output signal when the bit cells of a particular character have been filled. An output signal from the character cell counter may then be applied to a character block counter 114 which, together with the receipt of the key signal, can provide the appropriate redundant writing of the character and also provide a tape forward signal. The first count of the character block counter provides for the writing of a blank character cell and the next three character block counter signals provide for the three redundant recordings of the character as previously described.

Figure 13:
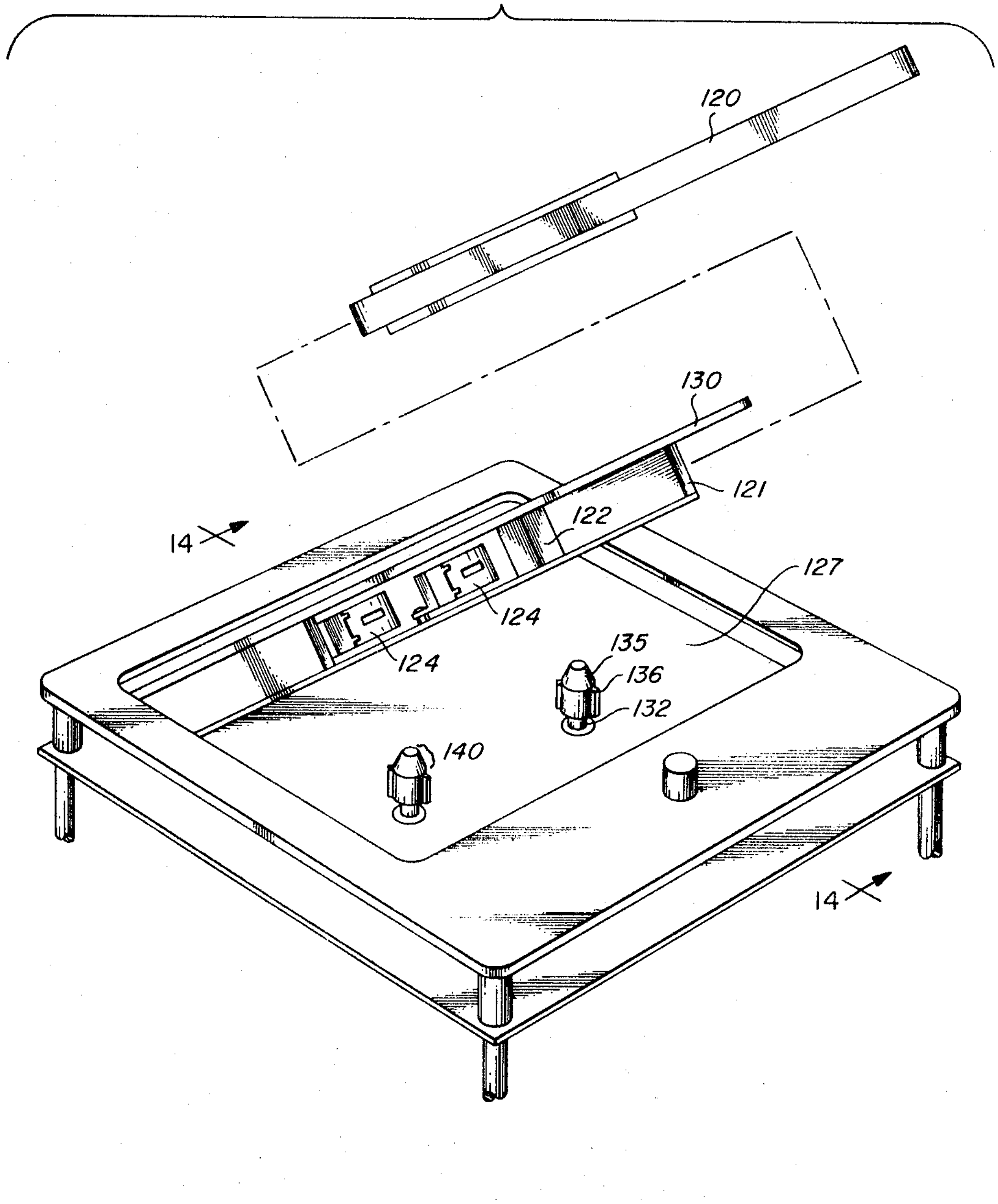
FIG. 13 is a partially exploded perspective view of a magnetic tape cassette drive showing a mounting and driving arrangement for use in the system of the present invention.
Figure 14:
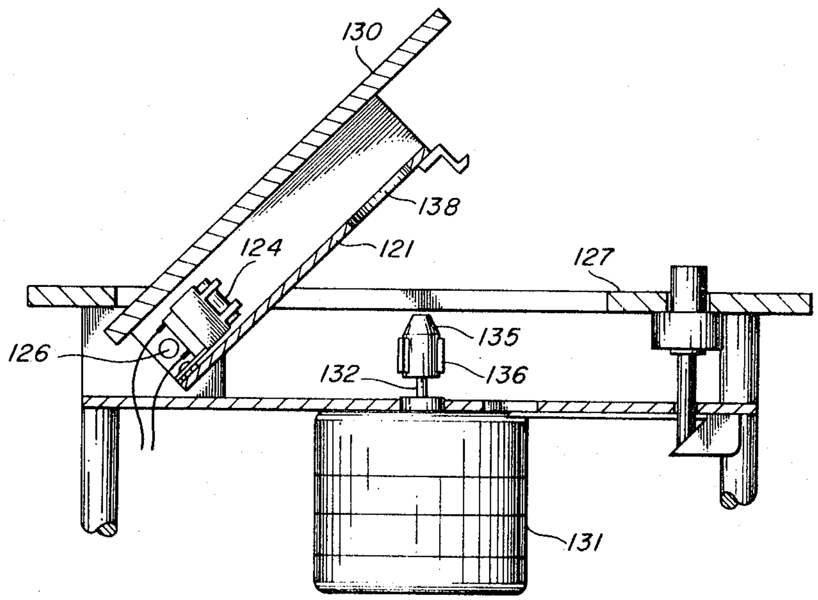
FIG. 14 is a cross-sectional view of a portion of FIG. 13, taken along lines 14—14.

The magnetic tape cassette described previously in connection with FIG. 5 may conveniently be mounted on a magnetic tape drive as shown in FIGS. 13 and 14. As therein shown, the magnetic tape cassette 120 may be placed in a cassette receiver 121 with the openings for the magnetic heads entering the receiver first. The cassette 120 is pushed into the receiver 121 until it abuts a stop 122. In that position, the openings along the edge of the magnetic tape cassette expose the tape and properly position the tape against recording and reading heads 123 and 124. The cassette may conveniently be held in position by a spring clip (not shown) so that it will remain in abutting contact with the stop 122. In this position, the tape-to-head positioning has been accomplished and no further actions interfere with this critical spacing. The receiver 121 is pivoted at a hinge 126 on a platform 127. The receiver is pivotable on the hinge 126 between a loading position (as shown in FIGS. 13 and 14) and a recording position wherein the upper surface 130 of the receiver is coplanar with the platform 127.

The platform also supports drive motors such as the motor 131, the output shaft 132 of which is secured to a splined shaft or spindle 135. The splines 136 thereon engage the radially, inwardly extending teeth of the cassette hubs as described previously in connection with FIG. 5. Openings, such as the opening 138, in the bottom of the receiver, are provided to admit the spindles. The magnetic tape cassette may then be conveniently loaded into the recording system by simply inserting it into the receiver and pivoting the receiver into coplanar relationship with the platform 127. This operation insures proper tape-to-head spacing and maintains that spacing during operation. The pivoting of the receiver about its hinge causes the engagement of the spindles with the hubs upon which the magnetic tape is wound. The tapering of the spindle such as shown at 140 facilitates the positioning of the hubs and the spindles and the normal tolerances available in magnetic tape cassettes of the audio type are more than adequate to provide ready engagement of the splines 136 with the teeth of the hubs. It may be noted that the cassette magnetic tape is driven solely by the energization of the motors connected to the spindles; that is, the magnetic tape is driven solely through the hubs upon which it is wound and departs from the present accepted data processing technique of utilizing a capstan drive.

Figure 15:
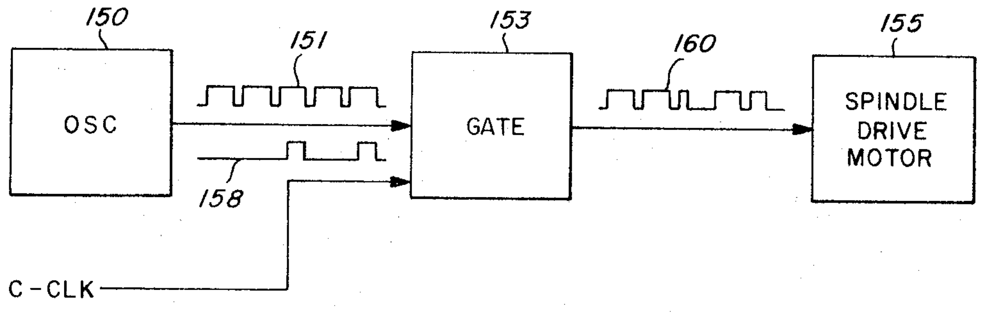
FIG. 15 is a schematic block diagram of the power control circuit for driving the cassette magnetic tape.

The magnetic tape may be driven through the spindle drive motors by any convenient means of the speed control; however, a unique arrangement to drive the spindle motors is shown in FIG. 15 in broken form. Referring to FIG. 15, an oscillator 150 provides output pulses schematically represented at 151 to a gate network 153. These pulses provide sufficient energization to a spindle drive motor 155 to accelerate it to a desired speed. The clock track pulses previously described as presently recorded on the cassette magnetic tape are also applied to the gate 152 as schematically illustrated by the waveform 158. The clock pulses are indicative of the speed with which cassette magnetic tape is being driven and can be used to inhibit the flow of energy from the oscillator to the spindle drive motor for simply closing the gate 153. The resulting output waveform is schematically illustrated at 160, wherein it may be seen that the total energy applied to the spindle drive motor 155 is a function of the area under the waveform and that this area is a function of the pulses received from the oscillator 150. Further, the total area (representing energy) is decreased as the number of clock pulses applied to the gate 153 is increased. In this manner, a steady state condition may be achieved wherein the speed of the tape has been accelerated by the application of a maximum rate of energy flow and wherein the speed has been regulated to a predetermined value by regulating the rate of energy flow.

The operation of the system of the present invention may be described as follows. A cassette magnetic tape is inserted into the keyboard such as that shown at 14 in FIG. 2 and the system is ready to accept information keyed therein by an operator through the depression of keys 15. As mentioned previously, the information may be entered via the keyboard which is arrayed in any convenient manner, such as a typewriter keyboard or key punch keyboard. It has been found that to afford compatibility with other types of systems, the use of ASCII is a convenient code for utilization with the keyboard. Depression of a key on the keyboard connects an appropriate driver in the key drive 30 in FIG. 3 to the core encoder where the character being keyed is automatically encoded. In the system of the present invention, it has been found appropriate to utilize a magnetic core encoder to provide the necessary temporary storage of the encoded information and provide rapid readout. The encoded character is applied to a shift register 36 which is immediately available for serially providing the code to a write head for writing the information on the tape. The cassette magnetic tape drive is energized and the tape begins forward movement. It will be recalled that the tape contains a clock track having prerecorded clock pulses thereon. The detection of the clocks on the tape gates the data from the shift register onto the tape in the manner previously described. A keying signal resulting from the depression of a keyboard switch combined with the receipt of the clock read from the cassette magnetic tape results in the counting of the bit time counter to write in the data track of the cassette magnetic tape the data clock time followed by the gating of the appropriate information bit during the data bit time; the data bit time is followed by the previously discussed blank during the third clock period of a bit cell. The character cell counter counts the number of bit cells to determine the number of bit cells being written into a character and provides for the blank bit cells in the end of each character. The character block counter insures that the initial character time is left blank on the cassette magnetic tape and that the next character cells contain the character being written to provide triple redundancy, each repetition of which is separated by a 2 bit cell blank space. The cassette magnetic tape thus contains information keyed therein through the expediency of a pre-recorded clock track and a conventional keyboard. Triple redundancy is provided together with substantial time reliability resulting from the triple clock time provided for each bit cell. Notwithstanding the triple redundancy and the built-in reliability, the magnetic tape cassette using conventional tape drive mechanism can accept and record on the cassette magnetic tape information at a greater rate than can be keyed by an operator. Further, the redundancy coupled with the built-in reliability substantially eliminates machine errors previously found in keypunch operations and permits the storage of information previously requiring over 500 punched cards on a small magnetic tape cassette occupying a total space of no more than 2.5 inches X 4 inches X ⅜ inches.

To translate the cassette magnetic tape into computer tape of either conventional 7 track or 9 track type, the cassette may be mounted on a converter such as that shown at 20 in FIG. 2. The converter simply reads the information on a cassette magnetic tape and code converts this information into a 3-track code described above for recording on the middle 3 tracks of the 7 or 9 track tape. The magnetic tape may be stored, mailed, or handled in any fashion similar to punched cards and since the tape is completely enclosed, it is less subject to damage with subsequent loss of information than the punched cards which it replaces. The information is read from the magnetic tape cassette by serially reading a character and placing the information in that character position into a buffer. If the information read from a particular character position is in error, the second recording of that character is read from the magnetic tape cassette; similarly, although the probabilities almost preclude ever having to rely on the triple redundancy provided in the magnetic tape cassette, the third recording of the character may be read if the first two contain errors. The encoding of the information thus read from the cassette magnetic tape into a coded bit configuration using the three middle tracks of the computer tape eliminates problems usually accompanying the utilization of computer tape in that the results of skew are minimized and the possibility of edge damage or contamination is minimized. The resulting computer magnetic tape contains information in serial bit configuration previously keyed into the cassette magnetic tape by an operator. The tape-to-tape conversion is extremely rapid and is a direct conversion requiring relatively inexpensive equipment. As a result of the implementation of the system of the present invention, very inexpensive cassette recording keyboard devices may be located at the source of information to be read into data processors. The cost of the equipment and the cost of operation of the equipment is comparable to ordinary key punch equipment with the exception that the compactness of the information thus stored coupled with the very significant reduction in errors resulting from the redundancy techniques raises the efficiency of the equipment and overall operation of the equipment and operator to a point greatly in excess of the ordinary keypunch operation. The storing and handling of cassette magnetic tape greatly simplifies the problems previously encountered with huge decks of punched cards. The punched cards previously were usually delivered to a processing center wherein they would be fed through a complex and very expensive card reading system to transfer the information contained on the punched cards to a computer magnetic tape. The resulting computer magnetic tape would contain in encoded form the information originally keyed into the punched cards. The system of the present invention converts the information on the cassette magnetic tape onto computer tape with equipment much less sophisticated, less expensive, and more reliable than the high-speed card readers of the prior art. The converter of the present system for converting cassette magnetic tape to computer tape simply incorporates a code conversion scheme using conventional encoding and buffering techniques for reading the cassette magnetic tape and writing the reencoded information onto the middle three tracks of the computer magnetic tape. The resulting computer magnetic tape contains an encoded form of the information previously keyed into the cassette magnetic tape. Subsequent utilization of the computer magnetic tape, whether containing information encoded thereon from cassette magnetic tape or from punched cards via a card reader, may subsequently be manipulated in accordance with a program to operate upon the information and/or place the information in a particular format in accordance with a data processor user's requirements.

I claim:

1. In a magnetic tape system having a pre-recorded clock track on magnetic tape, the improvement for controlling tape velocity comprising: a driving motor connected to a tape hub; a gate connected to said motor for applying electrical energy thereto and connected to receive pulses from said pre-recorded clock track; an oscillator connected to said gate for supplying electrical energy to said motor through said gate; said gate responsive to pulses from said pre-recorded clock track for limiting the passage of electrical energy from said oscillator to said motor; said gate inhibiting the passage of electrical energy therethrough for the duration of any pulse received from said pre-recorded clock track.

2. In a magnetic tape reading/writing system, the improvement comprising: a magnetic tape wound over two hubs, said magnetic tape having a pre-recorded clock track; a drive spindle removably engaging one of said hubs; a read head for reading said pre-recorded clock track and generating a clock pulse in response thereto; an oscillator for generating electrical pulses at a predetermined frequency; a spindle drive motor connected to said drive spindle responsive to the energy received in the form of electrical pulses for driving said drive spindle at a rotational velocity proportional to said energy; a gate connected to said oscillator and connected to receive said clock pulses; said gate connected to said drive motor for applying electrical pulses received from said oscillator to said motor, and responsive to the duration of a clock pulse received thereby for inhibiting the passage of electrical pulses from said oscillator to said drive motor.

3. The combination set forth in claim 2, including a pair of drive spindles, each removably engaging a different one of said hubs.

* * * * *